United States Patent [19]

Takei

[11] Patent Number: 5,681,088
[45] Date of Patent: Oct. 28, 1997

[54] POSITION ADJUSTABLE HEADREST

[75] Inventor: Yoshiyuki Takei, Akishima, Japan

[73] Assignee: Tachi-S Co., Ltd., Tokyo, Japan

[21] Appl. No.: 701,446

[22] Filed: Aug. 22, 1996

[51] Int. Cl.[6] .................................................. A47C 7/36
[52] U.S. Cl. ................................ 297/408; 297/DIG. 1
[58] Field of Search ................................ 297/391, 408, 297/DIG. 1

[56] References Cited

U.S. PATENT DOCUMENTS

| 3,675,970 | 7/1972 | Bereday | 297/DIG. 1 X |
| 4,849,046 | 7/1989 | Kanagawa et al. | 297/DIG. 1 X |
| 4,883,318 | 11/1989 | Adachi | 297/DIG. 1 X |
| 5,261,726 | 11/1993 | Yanagishita | 297/408 |
| 5,316,372 | 5/1994 | Amner . | |
| 5,478,136 | 12/1995 | Takeuchi et al. . | |

FOREIGN PATENT DOCUMENTS

| 2-57441 U | 4/1990 | Japan . |
| 2-61232 U | 5/1990 | Japan . |
| 4-164404 | 6/1992 | Japan . |
| 5-337965 | 12/1993 | Japan . |
| 7-39660 | 2/1995 | Japan . |

*Primary Examiner*—Milton Nelson, Jr.
*Attorney, Agent, or Firm*—Browdy and Neimark

[57] ABSTRACT

A headrest of the type rotatable forwards and backwards relative to a headrest stay, which comprises a trim cover assembly of a box-like configuration, a frame disposed in the trim cover assembly, the frame being rotatably connected to the headrest stay, with the headrest stay passing through the trim cover assembly, and a foam cushion member which is formed by a foaming process together with the frame within the trim cover assembly. The trim cover assembly includes a pair of folded extensions folded generally at a right angle therefrom and extending inwardly thereof, which are defined at a point where the headrest stay passes through the trim cover assembly. Such pair of folded extensions have, defined therein, openings designed not only to prevent leakage of a liquid foaming base material from the trim cover assembly during the foaming process, but also allow the fore-and-aft rotation of headrest relative to the headrest stay. The folded extensions are effective in receiving a full pressure at both sides thereof from an outward expanding mass of foam cushion member during the foaming process, to provide a positive closing of the folded extensions and openings.

13 Claims, 3 Drawing Sheets

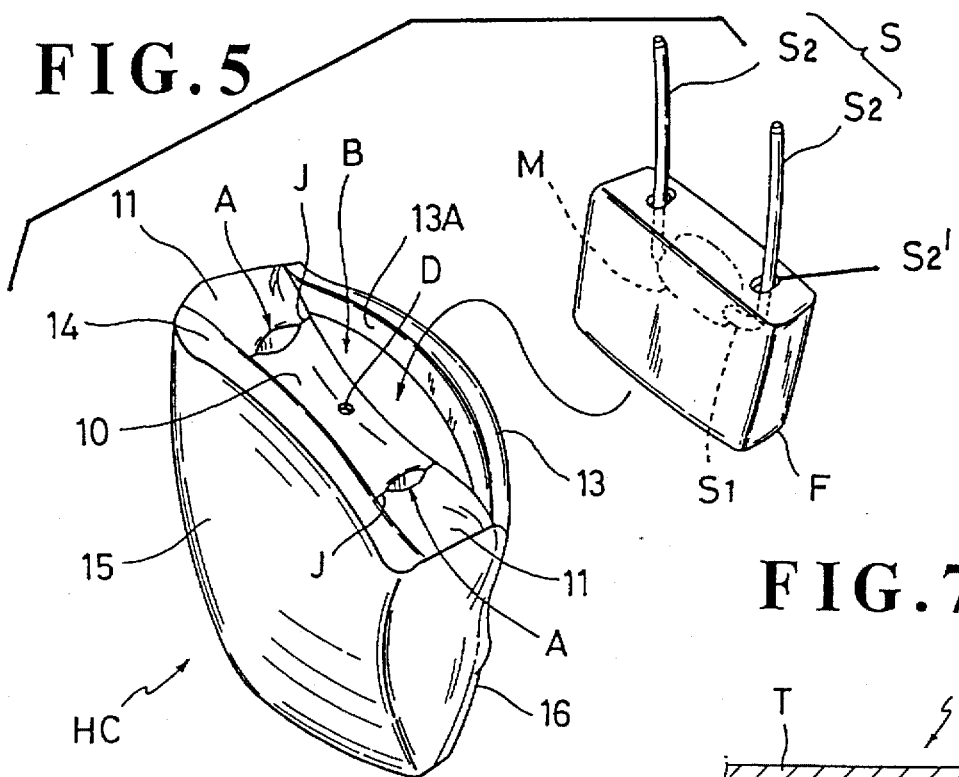
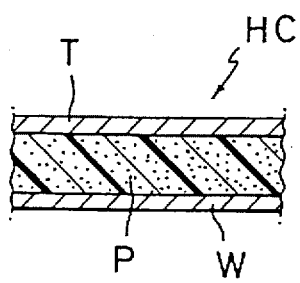
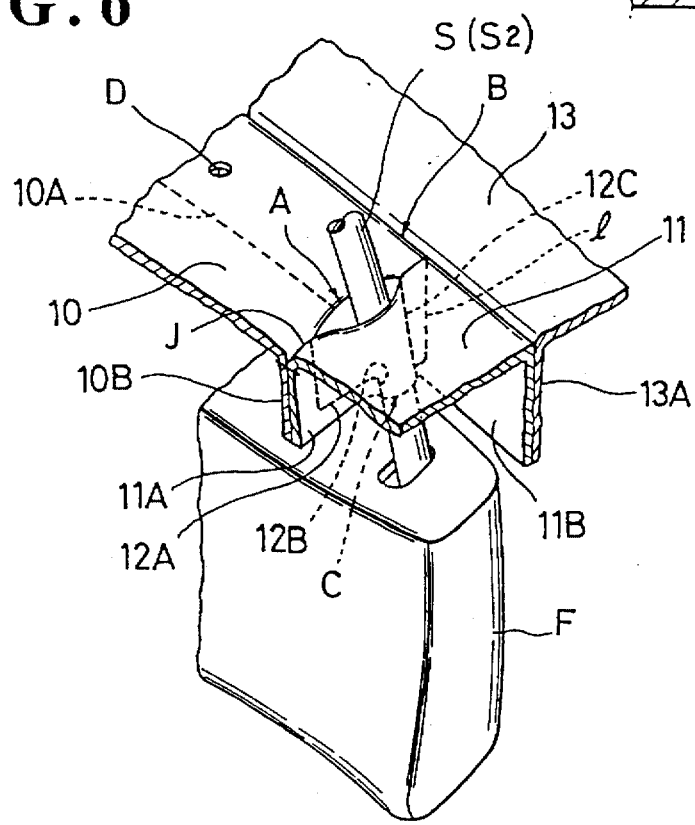

POSITION ADJUSTABLE HEADREST

BACKGROUND OF INVENTION

1. Field of the Invention

The present invention relates to a headrest for use in an automotive seat, and in particular to the headrest of this kind, which comprises a three-dimensional trim cover assembly formed from several parts of cover materials into a box-like configuration and a swingable type of headrest frame rotatably mounted to a headrest stay, wherein the headrest frame complete with the headrest stay is inserted into within such box-like trim cover assembly, after which, a liquid foaming base material is injected into the trim cover assembly and a foaming is effected to assemble together those elements into an integral unit of headrest.

2. Description of Prior Art

Among various forms of headrests for an automotive seat, there is a rotatable type of headrest which may be rotated about a given center of rotation relative to a headrest stay fixed on a seat back of the seat, such that a head support surface of the headrest may be adjusted forwardly and backwardly of the seat back to provide a desired support point to the head of an occupant sitting on the seat. (See FIG. 1 for instance) Further, this kind of headrest has been produced under an integral foaming process in an attempt to simplify and expedite its assemblage. Namely, a headrest frame complete with a headrest stay is inserted into a box-like trim cover assembly which is formed by sewing together several parts of cover materials into a three-dimensional box-like shape, after which, those elements are placed in a foaming die and subjected to a foaming therein through the steps of injecting a liquid base foaming material into the trim cover assembly and curing the same together with the headrest frame and stay, whereby one integral unit of headrest is obtained.

In this sort of headrest, it is so arranged in the foaming process that an elongated hole is provided in the resulting headrest body so as to permit the headrest body to be rotatable forwardly and backwardly relative to the headrest stay.

However, it has been found that a liquid foaming base material easily leaks out through such elongated hole during the foaming process, causing damage during assembling the headrest.

Solution to this problem is suggested, for example, from the Japanese Laid-Open U.M. Pub. No. 6-86608, in which a cylindrical member of hard plastic material is sewn to a trim cover assembly so that a headrest stay is inserted through such cylindrical member prior to the foaming process in order to avoid leakage of the foaming base material. But, this prior art requires sewing of the hard cylindrical member to the trim cover assembly, which is troublesome and time-consuming, and lowers the productivity of headrest. Also, such cylindrical member does not work to completely prevent leakage of the foaming base material, because it still leaves some clearances through which the foaming material may be leaked out, and the hardness of cylindrical member per se is not adaptable for easy reformation to provide a complete prevention of the leakage.

SUMMARY OF THE INVENTION

In view of the above-stated drawbacks, it is a primary purpose of the present invention to provide an improved headrest of the type rotatable forwards and backwards relative to a headrest stay secured on a seat back of seat, which has a simplified structure effective in not only expediting its assembling, but also preventing leakage of a liquid foaming base material from an opening area through which the headrest stay passes, during a foaming process for assemblage of the headrest.

In order to achieve such purpose, the headrest in accordance with the present invention is basically comprised of:

a frame rotatably connected to a headrest stay;

a trim cover assembly of three-dimensional configuration conforming to an outer shape of the headrest, in which the frame and headrest stay are inserted and disposed, with a part of the headrest stay passing through and outwardly of the trim cover assembly at a predetermined point;

a foam cushion member formed within the trim cover assembly, which foam cushion member is formed by a foaming process including the step of injecting a liquid foaming base material into the trim cover assembly and subjecting the same to a foaming; and the trim cover assembly having an elastic property, and including:
  (a) a pair of folded extensions extending inwardly of the trim cover assembly at the predetermined point where the foregoing part of headrest stay passes through the trim cover assembly;
  (b) a first opening means for defining an opening in the pair of folded extensions in such a manner as to be opened outwardly of the trim cover assembly and and elongated along the foregoing forward and backward directions;
  (c) a second opening means for defining an opening in the pair of folded extensions in such a manner as to be opened inwardly of the trim cover assembly and to have an inner diameter generally equal to an outer diameter of the headrest stay; and
  (d) a sealing means for sealing a contour of the first opening means in the pair of folded extensions, excepting a side where the first opening means opens outwardly of the trim cover assembly.

Accordingly, the second opening means and sealing means prevent leakage of the liquid foaming base material from the area where the headrest stay passes, and the first opening means permits the headrest to be rotated in the fore-and-aft direction relative to the headrest stay without interference therebetween. Further, the trim cover assemlby simply has a pair of two folded extensions for defining those first and second opening means therein, which does not require other separate means for preventing leakage and thus contributes to a rapid assemblage of headrest at low costs.

Preferably, the trim cover assemlby may be of a three-layer lamination structure comprising a top cover layer, a foam padding layer and a back cloth.

Preferably, the sealing means may be defined by sewing together said two folded extensions along the contour of said first opening means.

Preferably, the trim cover assembly may further include another pair of folded extensions extending inwardly thereof in which an entry opening is defined to allow the frame and headrest to be inserted therethrough and entered into the trim cover assembly.

In one aspect of the present invention, such pair of folded extensions are folded generally at a right angle from the trim cover assembly, extending inwardly thereof in contact with each other, so that the two folded extensions, by virtue of their elastic recovery forces, tend to contact with each other closely, thereby biasingly closing the first and second opening means, and further both sides of the two folded extensions receive a full pressure from an outward elastic expanding mass of said foam cushion member in addition to their own elastic recovery forces, thereby making a positive contact between the two folded extensions and a closing of the first and second opening means.

In another aspect of the invention, the trim cover assembly may have another pair of folded extensions in addition to the foregoing one pair of folded extensions, so that two stay portions of headrest stay may pass through such one and another pair of folded extensions, respectively. In this instance, the trim cover assembly may include a first cover section having a pair of folded extensions each being defined at the respective both sides thereof, and a pair of second cover sections each having one folded extension, with such an arrangement that one of the paired folded extensions of first cover section is juxtaposed with one folded extension associated with one of the pair of second cover sections to provide one pair of folded extensions, while another of the paired folded extensions of first cover section is juxtaposed with another folded extension associated with another of the pair of second cover sections to provide another pair of folded extensions, whereby the two stay portions of headrest stay pass through those one and another pairs of folded extensions, respectively, and further the aforementioned first and second opening means and sealing means are defined in each of those one and another pairs of folded extensions.

Other features and advantages of the present invention will become apparent from reading of descriptions hereinafter, with reference to the annexed drawings.

BRIEF DESCRIPTION OF THE DRAWINGS

FIG. 5 is a schematic exploded perspective view of the headrest, showing a trim cover assembly and a frame complete with a headrest stay which form the headrest;

FIG. 6 is a partly broken perspective view of the trim cover assembly and frame with the headrest stay, which implies a state where those elements are set in a foaming die during a foaming process; and FIG. 7 is a fragmentary sectional view of the trim cover assembly.

DETAILED DESCRIPTION OF PREFERRED EMBODIMENT OF THE INVENTION

Referring to FIGS. 1 through 6, there is illustrated the structure of a headrest generally designated at (H) in accordance with the present invention.

Figure 1:
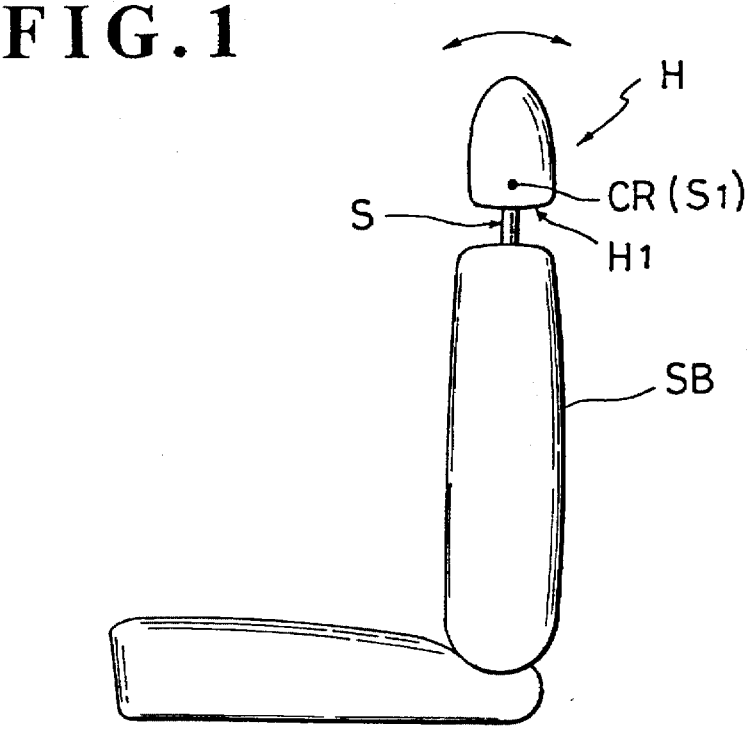
FIG. 1 is a schematic side view of an automotive seat to which a headrest in accordance with the present invention is applied.

As shown in FIG. 1, the headrest (H) is of the type swingable upon a headrest stay (S) secured on the top of seat back (SB) of an automotive seat. In other words, as understandable from FIGS. 1, 3 and 5, the headrest (H) is rotatable about a given center of rotation (CR), i.e. the horizontal stay portion (S1) of a generally U-shaped headrest stay (S), thus permitting the headrest to be adjustably rotated forwardly and backwardly of the seat back (SB), as indicated by the arrow in FIG. 1, so that an occupant on the seat may attain his or her optimal head support point in the fore-and-aft direction.

Figure 3:
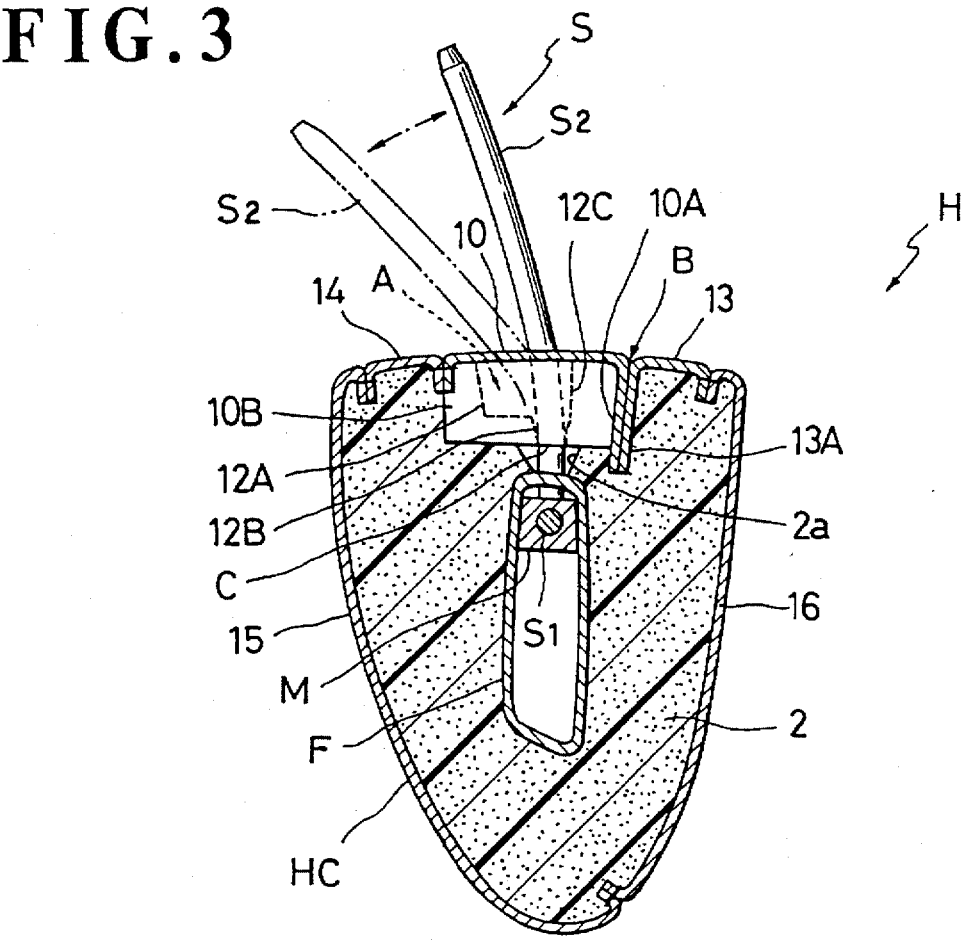
FIG. 3 is a longitudinally sectional view take along the line III—III in FIG. 2.
Figure 4:
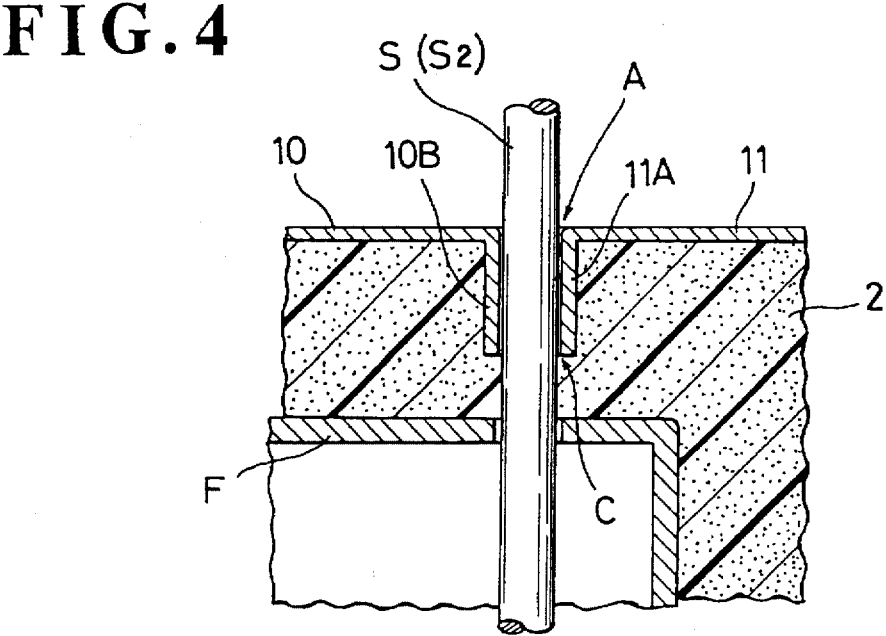
FIG. 4 is a schematic enlarged fragmentary sectional view of one principal part of the headrest.

As seen in FIG. 3, the headrest (H) is comprised of a trim cover assembly (HC), a foam cushion member (2) and a frame (F) complete with a headrest stay (S). The headrest stay (S) is rotatably connected via a rotation adjustment element (M) to the frame (F). Stated more specifically, the headrest stay (S) is formed generally in a "U" shape, having a horizontal stay portion (S1) and a pair of spaced-apart vertical stay portions (S2)(S2), and the frame (F) is formed to have a hollow therein. The rotation adjustment element (M) is fixed within one end area of such hollow of frame (F) adjacent to the bottom side (H1) of headrest (H) which is shown as reversed in FIG. 3, but can be viewed from FIG. 1. As seen from both FIGS. 3 and 5, the headrest stay (S) is so coupled to the frame (F) that the horizontal stay portion (S1) of stay (S) extends through the rotation adjustment element (M) within the frame (F), while the two vertical stay portions (S2)(S2) of stay (S) passes through two respective holes S2'S2' formed in the frame (F) to the outside. Frame (F) per se is therefore rotatable about the axis of horizontal stay portion (S1). The rotation adjustment element (M) may be a suitable known frictional element, such as a U-shaped leaf spring member to retain the stay portion (S1) therein with a proper friction, so that the frame (F) or headrest (H) may be adjusted in angle of rotation in the fore-and-aft direction relative to the two vertical stay portions (S2)(S2) or the stay (S). The two vertical stay portions (S2)(S2) are secured in the top of seat back (SB) as in FIG. 1.

The trim cover assemlby (HC) is formed in a closed box-like configuration conforming to a predetermined outer shape of headrest (H). More specifically, the trim cover assembly (HC) is formed in that configuration by sewing together the following separate cover sections: a frontal cover section (15) defining the forward and both lateral surfaces of headrest (H); a back cover section (16) defining the backward surface of headrest (H) and a set of plural bottom cover sections (10)(11)(13)(14) defining the bottom surface (at H1) of headrest (H). As shown, the frontal cover section (15) and back cover section (16) are sewn together at their respective one terminal ends, and further sewn, at their another terminal ends, with the peripheral terminal ends of the foregoing plural bottom cover sections (10, 11, 13, 14).

Referring to FIG. 7, the trim cover assembly (HC) per se, inclusive of all those sections (10, 11, 13, 14, 15, 16), is of a three-layer lamination structure comprising a top cover layer (T) (e.g. a woven fabric), a slab foam padding layer (P) (e.g. a slab urethane foam) and a back cloth layer (W) (e.g. a non-woven fabric) in this order. This is one preferred mode of trim cover assembly in the present invention to provide a certain elasticity for fulfilling a purpose to be explained later, and other kinds of cover materials having a suitable elasticity may be used in the present invention.

In accordance with the present invention, the aforementioned bottom cover sections are essentially composed of: a central bottom cover section (10); a pair of lateral bottom cover sections (11)(11); a first transverse bottom cover section (13) and a second transverse bottom cover section (14). It is to be understood from FIGS. 3 and 5 that the peripheral terminal ends of such bottom cover section group are provided with small folded sewing margins sewn with those of the frontal and back cover sections (15)(16) as a usual sewing requirement. But, in accordance with the present invention, in particular, the central bottom cover section (10), two lateral bottom cover sections (11)(11) and first transverse bottom cover section (13) are each provided with relatively large folded extensions for the purpose of presenting principal features of the present invention, as will become apparent later. Namely, the central bottom cover section (10) is so formed as to have a first folded extension (10A) defined at one longitudinal side thereof, which is folded generally at a right angle therefrom, and a pair of second folded extensions (10B)(10B) (See FIGS. 3 and 6) which are each defined at the respective two lateral sides of the cover section (10) and folded generally at a right angle therefrom. The two lateral bottom cover sections (11)(11) are identical to each other in sizes, and each of them is so formed as to have a first folded extension (11B) defined at one side thereof and a second folded extension (11A) defined at another side thereof. As best shown in FIG. 6, both first and second folded extensions (11B)(11A) are folded generally at a right angle from their respective planar surface areas of the two cover sections (11)(11), and further adjoined with each other at (l). The first transverse cover section (13) has one folded extension (13A) which is defined at one longitudinal side thereof and folded generally at a right angle therefrom.

Figure 2:
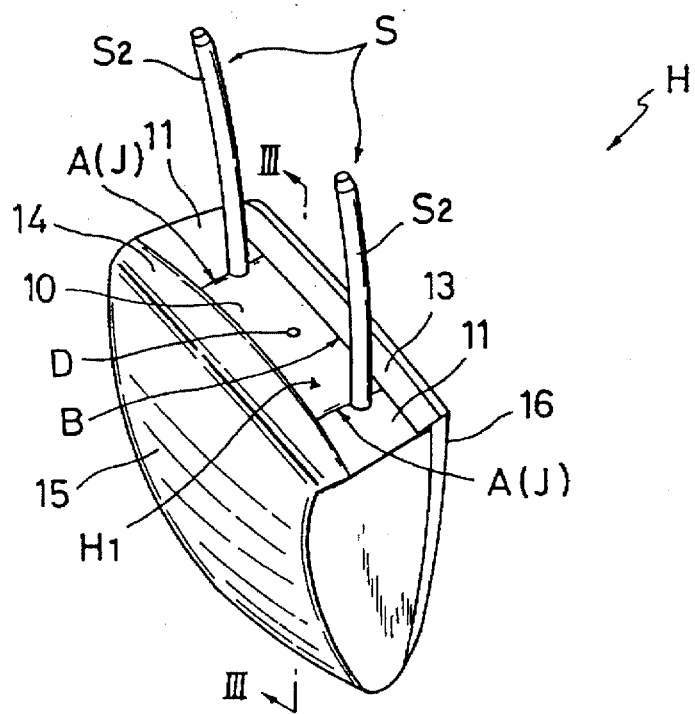
FIG. 2 is a schematic perspective view of the headrest, which shows the reversed state of the same.

In assembling the headrest trim cover assembly (HC), the basic formation of such bottom cover section group (10, 11, 13, 14) is as follows:

(i) The second transverse cover section (14) is sewn, at its three ends, with the corresponding given ends of frontal cover section (15), and further sewn, at the remaining one longitudinal end thereof, with one longitudinal end of the central cover section (10), as can be seen from FIGS. 2, 3 and 6.

(ii) The two lateral cover sections (11)(11) are each sewn, at its one end opposite to its second folded extension (11A), with the respective two lateral sides of central cover section (10), and further sewn with a part of the abovementioned remaining one longitudinal end of second transverse cover section (14), as can be seen from FIGS. 2 and 5.

(iii) The central cover section (10) is sewn, at its one end opposite to its first folded extension (10A), with a part of the abovementioned remaining one longitudinal end of second transverse cover section (14), while the two second folded extensions (10B)(10B) of the same section (10) are each subjected to a special sewing with the two second folded extensions (11A)(11A) respectively of the paired lateral cover sections (11)(11), at the juncture (J). Reference being made to FIGS. 3 and 6, such special sewing should be effected between those two folded extensions (10B)(11A) to inscribe a generally L-shaped seam (12A), a short vertical seam (12B) and a long vertical seam (12C), with the long vertical seam (12C) extending generally in parallel with the L-shaped and short vertical seams (12A)(12B), as shown, whereby an elongated opening (A) is defined between the L-shaped and long vertical seams (12A) (12C) and a narrowed opening (C) defined between the short and long vertical seams (12B)(12C). Those elongated and narrowed openings (A)(C) communicate with each other to provide a passage through which the headrest stay (S) is to be inserted as will be explained later. It is observed that the elongated opening (A) opens outwardly from this particular area of trim cover assembly (HC) and extends in a direction to intersect the longitudinal direction of the second transverse cover section (14), which corresponds to the fore-and-aft direction wherein the present headrest (H) is rotated relative to the seat back (SB), as in FIG. 1. Also, it is noted that the narrowed opening (C) opens inwardly from this particular area of trim cover assembly (HC) and has an inner diameter generally equal to the outer diameter of stay (S) to permit the stay to pass therethrough while embracing closely the circumferential surface of the stay, which prevents leakage of liquid foaming base material, as will be stated later. In this regard, the two folded extensions (10B)(11A) tend to contact with each other, due to the elastic recovery force of foam padding layer (P) of trim cover assembly (HC), thereby causing both openings (A) and (C) to be resiliently closed. Thus, it is seen that the juncture (J) between the two second folded extensions (10B)(11A) respectively of the central and lateral cover sections (10)(11) is resiliently closed due to the contact between those two different folded extensions (10B)(11A), whereas other juncture between the central cover section (10) and second transverse cover section (14) is in a fixedly closed state. As shown in FIG. 5 in conjunction with FIG. 6, a pair of those two openings (A)(C) are provided and spaced apart from each other in such a manner that a pair of spaced-apart vertical stay portions (S2)(S2) of headrest stay (S) may be inserted respectively through the pair of two openings (A)(C). In other words, the length of central cover section (10) between its two second folded extensions (10B) (10B) is substantially equal to the width between the two vertical stay portions (S2)(S2) of headrest stay (S) so that the two junctures (J)(J) or the two openings (A)(A) are disposed at points corresponding to the respective two stay portions (S2)(S2).

(iv) The first transverse cover section (13) is sewn with the two lateral cover sections (11)(11) and back cover section (16), such that the two lateral end portions of folded extension (13A) associated with that cover section (13) are partly sewn with the respective first folded extensions (11B)(11B) of two lateral cover sections (11)(11), to thereby define an entry opening (B), whereas another longitudinal end of the same cover section (13) opposite to its folded extension (13A) is fully sewn with the back cover section (16), as can be seem from FIGS. 3 and 5. It is observed that the entry opening (B) extends in such an elongated manner along a width-wise direction of the headrest trim cover assembly (HC), providing an opening width greater than the width of the frame (F). This permits entry of the frame (F) through the opening (B) into within the trim cover assembly (HC), as indicated in FIG. 5. As similar to the openings (A)(C), the entry opening (B) is normally closed with resiliency due to the elastic recovery force inherit in the foam padding layer (P) of trim cove assembly (HC).

Designation (D) denotes an injection hole perforated in the foregoing central cover section (10), in which injection hole, an injection nozzle may be inserted for a foaming purpose to be set forth later.

Although not clearly shown, the headrest (H) is produced by subjecting the above-described trim cover assembly (HC) and frame (F) with headrest stay (S) to a foaming process to have such integral foamed structure in section as shown in FIG. 3. Description will be made of such foaming process, in brief, to facilitate more understanding of the significant points of the present invention. Referring to FIG. 5, at first, the entry opening (B) is opened wide against the elastic recovery force of trim cover assemlby (HC), as shown, and then the frame (F) complete with the headrest stay (S) is inserted through that entry opening (B) into the inside of trim cover assemlby (HC). Thereafter, within the trim cover assembly (HC), the two vertical stay portions (S2)(S2) are respectively inserted into and passed through the two narrowed openings (C)(C), and further passed through the two elongated openings (A)(A), respectively, to the outside, as can be seen in FIG. 6. At this stage, as partly shown in FIG. 6, the frame (F) is accommodated in the trim cover assembly (HC), with the two stay portions (S2) projecting outwardly from the respective elongated openings (S). Also, the entry opening (B) is in a closed state. This incomplete unit of headrest is placed and secured in a suitable foaming die (not shown). Here, in accordance with the present invention, it is important that, prior to a foaming operation, the frame (F) should be so set in the trim cover assembly (HC) that the center of rotation (at S1) of the headrest (H) is disposed adjacent to the narrowed opening (C) and centrally of the trim cover assembly (HC), as shown in FIG. 3. This is based on the reason that the point of vertical stay portion (S2) adjacent to the axis of horizontal stay portion (S1) is bound to the narrow opening (C), and therefore, the corresponding area of headrest (H) to such point does not require its appreciable rotation about the axis of horizontal stay portion (S1), which is understandable from the rotational range of headrest (H) as indicated by the solid and two-dot chain lines and arrow in FIG. 3. Then, an injection nozzle (not shown) associated with a foaming base material supply device (not shown) is inserted into the injection hole (D) of trim cover assembly (HC), and a foaming base material in liquid is injected from the nozzle into within the hollow of trim cover assembly (HC). Thereafter, a foaming operation is executed in a known process to form a foam cushion member (2) in the trim cover assembly (HC), with the frame (F) embedded in the cushion member (2), whereupon there is produced an integral complete unit of headrest (H) as typically shown in FIG. 3. It is to be appreciated that, at the step of injecting a liquid foaming base material into the trim cover assembly (HC), the openings (A) and (C) are prevented against invasion of the liquid foaming base material thereinto, because the former (A) is given the L-shaped and vertical seams (12A)(12C) to make positive the close contact between the two folded extensions (10B)(11A) to provide a sealing surrounding it, and the latter (C) embraces tight the circumferential surface of headrest stay vertical portion (S2) to attain a sealing therearound. The entry opening (B) is also provided with a sealing against the liquid foaming base material by virtue of its associated two folded extensions (11B)(13A) contacting with each other closely due to their resilient recovery forces mentioned above. Further, it is to be appreciated that, during foaming process, the outward elastic expanding mass of foam cushion member (2) applies a pressure to each of the juxtaposed folded extensions (10B, 11A) and (11B, 13A) from both sides, thus acting to completely close those openings (A, B, C) in cooperation with the elastic recovery forces of the folded extensions (10B, 11A, 11B, 13A), so that all the openings (A, B, C) are not only sealed perfectly during the foaming process to insure preventing leakage of liquid foaming base material from the trim cover assembly (HD), but also closed more neatly to improve the aesthetic appearance of resulting headrest (H) as shown in FIG. 2. Obviously, this effect is particularly attained from the inward 90-degree projection of folded extensions (10B, 11A)(11B, 13A) from the coplanar bottom surfaces (at H1) of trim cover assembly (HC) since each of the paired folded extensions receives a full pressure at both sides thereof from the expanding mass of foam cushion member (2).

In addition, the two elongated openings (A)(A) thus sealed leave elongated spacings or escapements in a direction along the fore-and-aft rotation of headrest (H) relative to the headrest stay (S), as can be seen in FIG. 3, to thereby avoid interference between the headrest body and the headrest stay portions (S2)(S2) when the headrest (H) is rotated forwardly and backwardly of the seat back (SB) as in FIG. 1.

Preferably, in order to make more smooth such rotation of headrest (H), an escapement slit (2a) may be formed between the frame (F) and the edges of two juxtaposed folded extensions (10B)(11A). As shown in FIG. 3, the slit (2a) may be so tapered as to diverge from the frame (F) towards the edges of folded extensions (10B)(11A) in consideration of the fore-and-aft rotation of headrest (H) relative to the headrest stay (S). This, however, applies only to the case where a spacing is given between the frame (F) and folded extensions (10B)(11A) due to a particular structural requirement in assemblage of headrest (H), and it is normally preferable that no spacing be given between the frame (F) and folded extensions (10B)(11A) to dispose the center of rotation (at S1) of headrest as near as possible to the narrowed opening (C) because the point of vertical stay portion (S2) adjacent that center of rotation is bound to such opening (C) and requires no escapement thereto as discussed earlier.

Accordingly, the present invention provides a simplified structure of headrest, only using the parts of trim cover assembly, to prevent leakage of liquid foaming base material from the openings at the junctures of trim cover assembly sections as well as the openings for passing of headrest stay therethrough, without need for other separate means for preventing the leakage, and moreover, provides an elongated opening (A) which serves as an escapement to the headrest stay to avoid interference between the headrest body and headrest stay when the headrest is rotated forwardly and backwardly of the seat back. This greatly contributes to rapid assembling of headrest at a lowest possible costs.

It should be understood that the present invention is not limited to the illustrated embodiments, but any other modifications, replacements and additions may be applied thereto without departing from the scopes of the appended claims. For example, the two folded extensions (10B)(11A) may be bonded together by an adhesive agent such as to define the elongated and narrowed openings (A)(C) therein, instead of the sewing described above. The two transverse cover sections (13)(14) may not be defined at the bottom side (at H1) of trim cover assembly (HC) and instead thereof, only the central and two lateral cover sections (10)(11,11) may be provided at the bottom side of trim cover assembly (HC) such that the folded extensions (10A)(11B, 11B) associated with those cover sections (10)(11,11) are juxtaposed and contacted with the inner surface of the backward cover section (16) to define an entry opening (B) therebetween. The horizontal stay portion (S1) may be rotatably connected to the outer surface of frame (F) via a rotation adjustment element (M) at a side adjacent to the narrowed opening (C).

What is claimed is:

1. A headrest comprising:
   a headrest stay for mounting onto a seat;
   a frame rotatably connected to said headrest stay to be rotatable in a forward and a backward direction relative to said headrest stay;
   a trim cover assembly of three-dimensional configuration conforming to an outer shape of the headrest;
   said headrest stay and frame being inserted and disposed in said trim cover assembly, with a part of said headrest stay passing through a predetermined point on the trim cover assembly and projecting outwardly therefrom;
   a foam cushion member formed within said trim cover assembly, said foam cushion member being formed by a foaming process including the step of injecting a liquid foam base material into the trim cover assembly and subjecting the same to foaming; and said trim cover assembly having an elastic property, and including:
(a) a pair of folded extensions extending inwardly of the trim cover assembly at said predetermined point;
(b) an elongated slot defining an opening through each of said pair of folded extensions in a direction outwardly of the trim assembly and along the forward and the backward direction, said elongated slot having a length greater than an outer diameter of said head rest stay;
(c) a through hole defining an opening through each of said pair of folded extensions in a direction inwardly of the trim cover assembly, said through hole having an inner diameter substantially equal to the outer diameter of said headrest stay, wherein said through hole communicates with said elongated slot;
(d) edges of said elongated slot and said through hole within each of said pair of folded extensions being sealed together by sealing means for engaging said edges.

2. The headrest according to claim 1, wherein said trim cover assembly is of a three-layer lamination structure comprising a top cover layer, a foam padding layer and a back cloth layer.

3. The headrest according to claim 1, wherein said trim cover assembly further includes another pair of folded extensions extending inwardly thereof in which an entry opening is defined to allow said frame and headrest to be inserted therethrough and entered into the trim cover assembly.

4. The headrest according to claim 1, wherein said pair of folded extensions are folded generally at a right angle from said trim cover assembly, extending inwardly thereof in contact with each other, so that said pair of folded extensions, by virtue of their elastic recovery forces, tend to contact with each other closely, thereby biasingly closing said elongated slot and through hole and further both sides 7 of said paired folded extensions receiving a full pressure from an outward elastic expanding mass of said foam cushion member in addition to said elastic recovery forces, thereby making positive a contact between the pair of folded extensions and a closing of said elongated slot and through hole.

5. The headrest according to claim 3, wherein said another pair of folded extensions are folded generally at a right angle from said trim cover assembly, extending inwardly thereof in contact with each other, so that said another pair of folded extensions, by virtue of their elastic recovery forces, tend to contact with each other closely, thereby biasingly closing said entry opening, and further both sides of said another paired folded extensions receiving a full pressure from an outward elastic expanding mass of said foam cushion member in addition to said elastic recovery forces, thereby making positive a contact between said another pair of two folded extensions and a closing of said entry opening.

6. The headrest according to claim 1, wherein said frame is so rotatably connected with said headrest stay that a center of rotation for said frame is located adjacent to said through hole.

7. The headrest according to claim 1, wherein said sealing means is defined by sewing together said two folded extensions along the edges of said elongated slot and said through hole within said pair of folded extensions.

8. A headrest of a type rotatable in forward and backward directions relative to an associated headrest stay, in which the headrest stay includes a pair of spaced-apart vertical stay portions, said headrest comprising:

a frame rotatably connected to said headrest stay;
a trim cover assembly of three-dimensional configuration conforming to an outer shape of the headrest, in which said frame and headrest stay are inserted and disposed, with said pair of spaced-apart vertical stay portions respectively passing through and outwardly of said trim cover assembly at two predetermined points;
a foam cushion member formed within said trim cover assembly, said foam cushion member being formed by a foaming process including the step of injecting a liquid foaming base material into said trim cover assembly and subjecting the same to a foaming; and
said trim cover assembly having an elastic property, and including:
(a) a pair of folded extensions extending inwardly of the trim cover assembly, said pair of folded extensions being defined at each of said two predetermined points at which said pair of vertical stay portions respectively pass through said trim cover assembly;
(b) an elongated slot defining an opening through each of said pair of folded extensions in a direction outwardly of the trim assembly and along said forward and backward directions, said elongated slot having a length greater than an outer diameter of said head rest stay;
(c) a through hole defining an opening through each of said pair of folded extensions in a direction inwardly of the trim cover assembly, said through hole having an inner diameter substantially equal to the outer diameter of said headrest stay, wherein said through hole communicates with said elongated slot;
(d) edges of said elongated slot and said through hole within each of said pair of folded extensions being sealed together by sealing means for engaging said edges.

9. The headrest according to claim 8, wherein said frame is so rotatably connected with said headrest stay that a center of rotation for said frame is located adjacent to said through hole.

10. The headrest according to claim 8, wherein said sealing means is defined by sewing together said pair of folded extensions along the edges of said elongated slot and said through hole within said pair of folded extensions.

11. The headrest according to claim 8, wherein said trim cover assembly includes a first cover section and a pair of second cover sections, and wherein said first cover section has a pair of first folded extensions each being defined at respective both ends thereof and said pair of second cover sections each has one second folded extension, with such an arrangement that one of said pair of first folded extensions is juxtaposed with said one second folded extension of one of said pair of second cover sections so as to define a first of said pair of folded sections, through which one of said pair of vertical stay portions passes, and another of said pair of first folded extensions is juxtaposed with said one second folded extension of another of said pair of second cover sections so as to define a second of said pair of folded sections, through which another of said pair of vertical stay portions passes.

12. The headrest according to claim 8, wherein said trim cover assembly further includes another pair of folded extensions extending inwardly thereof in which an entry opening is defined to allow said frame and headrest to be inserted therethrough and entered into the trim cover assembly.

13. The headrest according to claim 8, wherein said trim cover assembly includes a first cover section and a pair of second cover sections, wherein said first cover section has a pair of first folded extensions each being defined at respective both ends thereof and said pair of second cover sections each has one second folded extension, with such an arrangement that one of said pair of said first folded extensions is juxtaposed with said one second folded extension of one of said pair of second cover sections so as to define a first of said pair of folded sections, through which one of said pair of vertical stay portions passes, and another of said pair of first folded extensions is juxtaposed with said one second folded extension of another of said pair of second cover sections so as to define a second of said pair of folded sections, through which another of said pair of vertical stay portions passes, wherein said trim cover assembly further includes a third cover section having one folded extension extending inwardly of the trim cover assembly, wherein said first cover section is further formed with another folded extension extending inwardly of the trim cover assembly, wherein said pair of second cover sections are each further formed with another folded extension extending inwardly of the trim cover section, and wherein all said another folded extensions of said first cover section and pair of second cover sections are juxtaposed with said one folded extension of said third cover section so as to define thereamong an entry opening for allowing said frame and headrest stay to be inserted therethrough and entered into said trim cover assembly.

* * * * *